United States Patent [19]

DePrycker et al.

[11] Patent Number: 5,020,052

[45] Date of Patent: May 28, 1991

[54] PACKET SWITCHING NETWORK

[75] Inventors: Martin L. F. DePrycker, St. Niklaas; Michel P. M. DeSomer, Aalst, both of Belgium

[73] Assignee: Alcatel N.V., Amsterdam, Netherlands

[21] Appl. No.: 377,825

[22] PCT Filed: Dec. 15, 1987

[86] PCT No.: PCT/EP87/00792

§ 371 Date: Jun. 15, 1989

§ 102(e) Date: Jun. 15, 1989

[87] PCT Pub. No.: WO88/04869

PCT Pub. Date: Jun. 30, 1988

[30] Foreign Application Priority Data

Dec. 19, 1986 [BE] Belgium ............... 2/61131

[51] Int. Cl.[5] ........................... H04Q 11/04
[52] U.S. Cl. ..................... 370/60; 370/94.1; 370/54; 370/61; 340/825.03; 340/825.5
[58] Field of Search ........ 370/60, 94.1, 60.1, 370/61, 58.1, 58.2, 58.3, 53, 54; 340/825.5, 825.51, 825.52, 825.03, 826, 825.79, 825.8

[56] References Cited

U.S. PATENT DOCUMENTS

| 4,561,090 | 12/1985 | Turner | 370/60 |
| 4,692,917 | 9/1987 | Fujioka | 370/60 |
| 4,734,907 | 3/1988 | Turner | 370/60 |
| 4,837,761 | 6/1989 | Isono et al. | 370/60 |
| 4,891,802 | 1/1990 | Jasmer et al. | 370/60 |

OTHER PUBLICATIONS

IEEE Infocom '86, Fifth Annual Conference, "Computers and Communications Integration Design, Analysis, Management", Miami, Fla., 8-10 Apr. 1986, IEEE (New York, U.S.), J. S. Turner: Design of a Broadcast Packet Network: pp. 667-675.

Bulletin Scientifique de l'A.I.M, vol. 88, No. 2, Jun. 1975, (Liege, BE), T. E. Beeforth et al.: "Further Work on Data Communication Systems at the Unversity of Sussex", pp. 140-146.

The Post Office Electrical Engineers' Journal, vol. 70, No. 4, Jan. 1978 (London, GB), P. T. F. Kelly et al.: "The Telecommunications Network for EURONET", pp. 208-216.

Primary Examiner—Douglas W. Olms
Assistant Examiner—Alpus H. Hsu
Attorney, Agent, or Firm—Peter C. Van Der Sluys

[57] ABSTRACT

Packet switching network with first and second cascaded parts, including first and second switching modules respectively. In the second switching modules, the path selection is controlled by routing information contained in the packets. In the first switching modules this selection is performed without using routing information only for a path set-up packet, while for the following packets use is made of routing information on the route followed by the path set-up packet. Each module decides to multiplex an input stream on an output only when a calculated traffic load is smaller than a limit value. This load is calculated from traffic load parameters contained in the path set-up packet.

18 Claims, 3 Drawing Sheets

PACKET SWITCHING NETWORK

The present invention relates to a telecommunication packet switching network to transmit packets of information through switching modules included therein, said switching modules being interconnected and each having a plurality of receive ports to receive said packets, a plurality of transmit ports to transmit said packets, and means to select one of their transmit ports and to transfer packets arriving at one of their receive ports to said selected transmit port, said network including at least one first switching module able to select one of its transmit ports without using routing information included in said packets, and at least one second switching module wherein said selection is controlled by routing information included in said packets.

Such a packet switching network is already known in the art, e.g. from the article "Design of a Broadcast Packet Switching Network" by J. S. TURNER, published in the "Proceedings of INFOCOM '86" of April 1986, pages 667 to 675. This known network comprises a first part and a second part which are connected in cascade and include the above mentioned first and second switching modules respectively. Each of these first switching modules is able to freely select one of its transmit ports with the purpose of evenly distributing the traffic load over the first network part.

A drawback of this system is that packets belonging to a same communication generally follow different paths in the first part of the network. As a result, the order of arrival of these packets at their destination may be different from the order in which they were supplied to the network.

An object of the present invention is to provide a packet switching network of the above type but which while having the above mentioned advantage of traffic distribution does not present the last mentioned drawback, i.e. wherein the order of arrival at their destination of the packets belonging to a same communication is the same as the one in which these packets were supplied to the network.

This object is achieved due to the fact that said first switching module, only for the first packet of a communication, selects one of its transmit ports without using routing information contained in this packet, whereas for the following packets belonging to the same communication it selects one of its transmit ports by using routing information relating to the route followed by said first packet.

Another characteristic feature of the present packet switching network is that said network comprises a first and a second part which are connected in cascade and include said first and second switching modules respectively.

In this way the first switching modules may freely select a path through the first network part for the first packet and thus evenly distribute the traffic on this part. Because the same path is used by all the packets belonging to the same communication as this first packet and following the latter, not only the traffic distribution remains unaffected but also the order of transmission of these packets is maintained.

Another characteristic feature of the present invention is that said selection of said transmit port without using said routing information occurs at random.

The present invention also relates to a data processing system wherein input data streams are multiplexed to form a multiplexed output data stream on at least one output of the system.

Such a data processing system is for instance useful in the above packet switching system and is already known from the above mentioned article. If no precautions are taken the traffic load on this output may become too high and then adversely affect the quality of the output data stream.

Another object of the present invention is to provide a data processing system of the last mentioned type, but wherein a traffic overload on an output is prevented.

This object is achieved due to the fact that it includes processing means to allow an input data stream as part of said output data stream or not, depending on the result of a comparison of the total traffic load presented by said output data stream and a limit traffic load, said total traffic load being obtained from traffic load parameters of said input data streams.

By allowing an input data stream to be multiplexed on an output only when the limit traffic allowable thereon is not exceeded, any danger of traffic overload on this output is prevented.

The above mentioned and other objects and features of the invention will become more apparent and the invention itself will be best understood by referring to the following description of an embodiment taken in conjunction with the accompanying drawings wherein.

Figure 3:
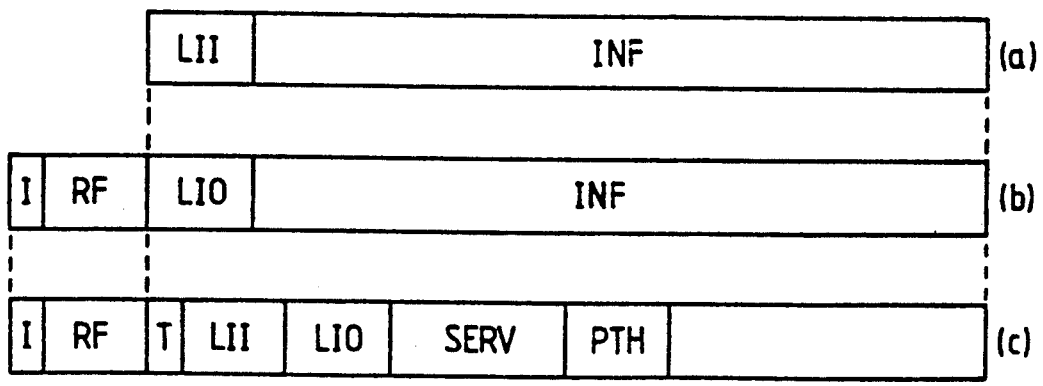
Figure 4:
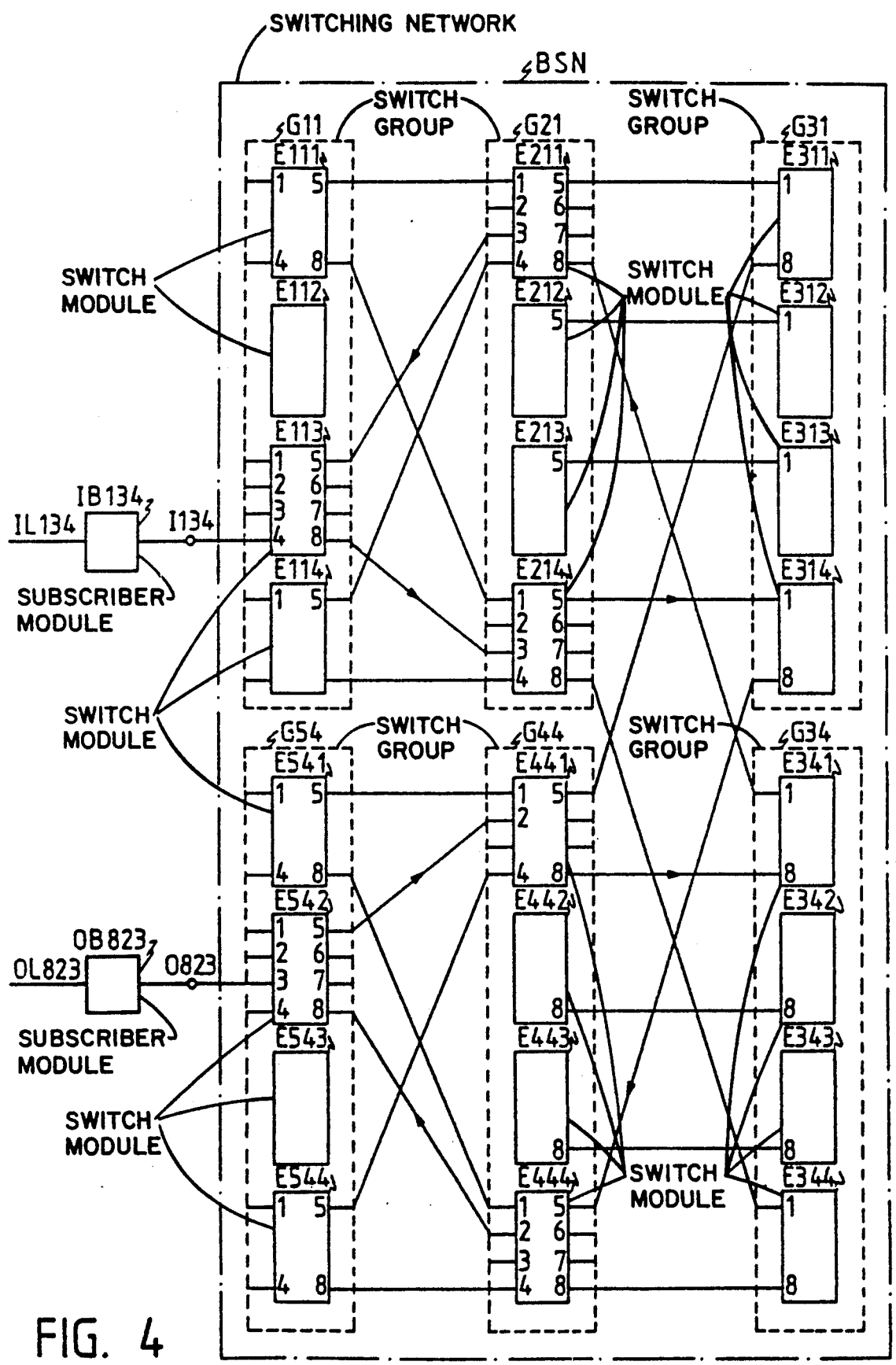

FIGS. 3(a)–(c) represent packets of information transmitted through the telecommunication system; and FIG. 4 shows a particular switching network BSN used to illustrate an example.

Figure 1:
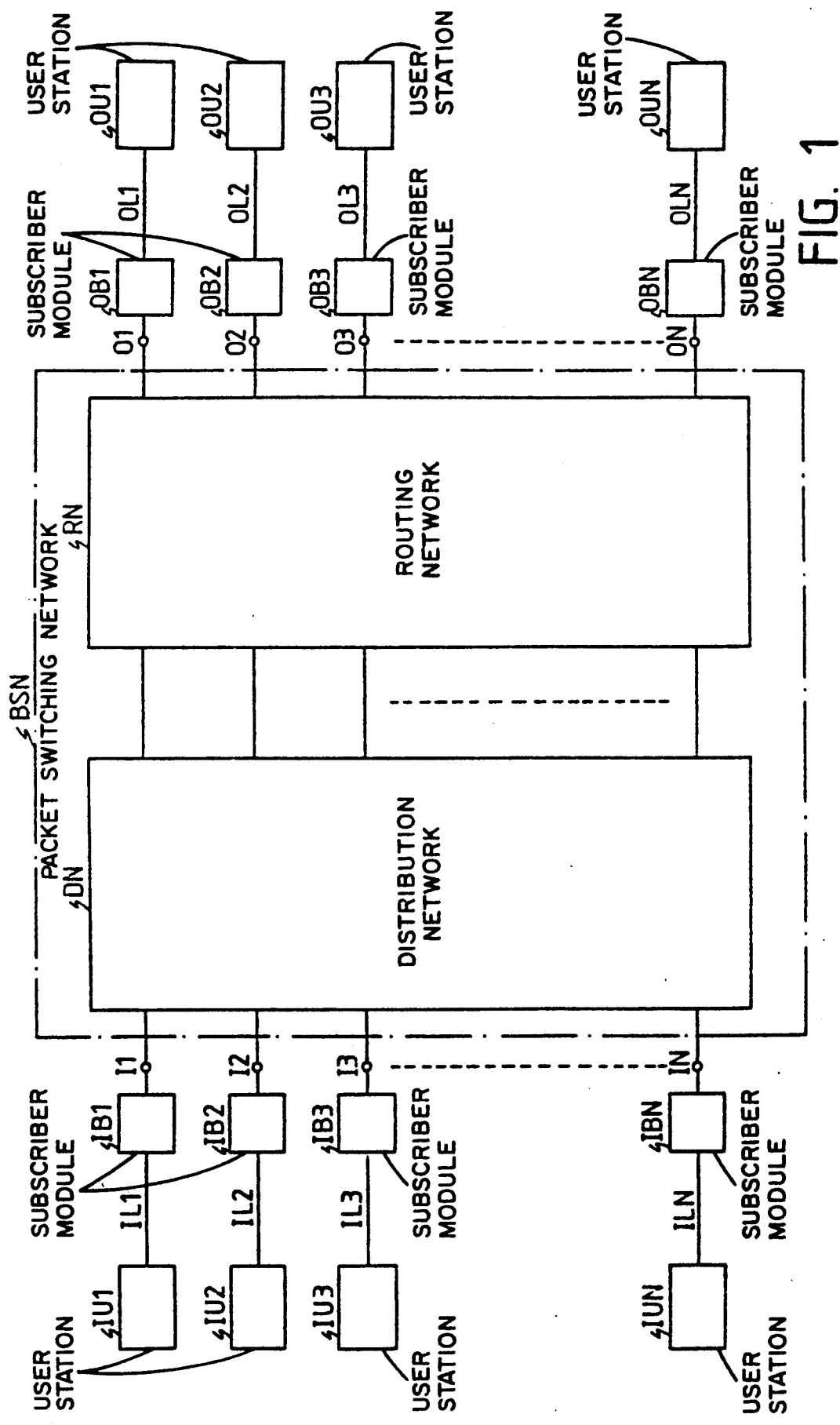
FIG. 1 is a block diagram of a telecommunication system including a packet switching network BSN according to the invention.

The packet switching network BSN shown in FIG. 1 is a multi-stage broadband switching network forming part of a digital telecommunication system and is able to perform switching of packets between user stations IU1/IUN, OU1/OUN coupled to it via broadband subscriber modules IB1/IBN, OB1/OBN and asynchronous time division (ATD) transmission links IL1/ILN, OL1/OLN. More in detail, the switching network BSN has N input terminals I1 to IN to which N calling or call originating user stations IU1 to IUN are connected via N transmission links IL1 to ILN and N broadband subscriber modules IB1 to IBN respectively, and N output terminals O1 to ON which are connected to N called or destination user stations OU1 to OUN via N broadband subscriber modules OB1 to OBN and N transmission links OL1 to OLN respectively. A broadband subscriber module will be described in more detail later. The N input terminals I1/IN of the BSN are coupled to its N output terminals O1/ON via a number of cascaded stages of switching modules. Each stage contains a maximum of N/n broadband switching modules BSE such as the one shown in FIG. 2 and which will be described later, n being the number of input terminals and of output terminals of one BSE.

As shown in FIG. 1, the BSN may functionally be divided in two parts: a distribution network DN and a routing network RN. A number of stages of switching modules BSE constitute the distribution network DN and the remaining stages of switching modules BSE constitute the routing network RN. As will be explained in more detail later, the purpose of the distribution network DN is to evenly distribute the traffic load of the communications over the whole BSN on a statistical basis, whilst the purpose the routing network RN is to route the packets received from DN to the destination user stations OU1/OUN. As mentioned above, both the distribution network DN and the routing network RN of the BSN are built with identical switching modules BSE.

Figure 2:
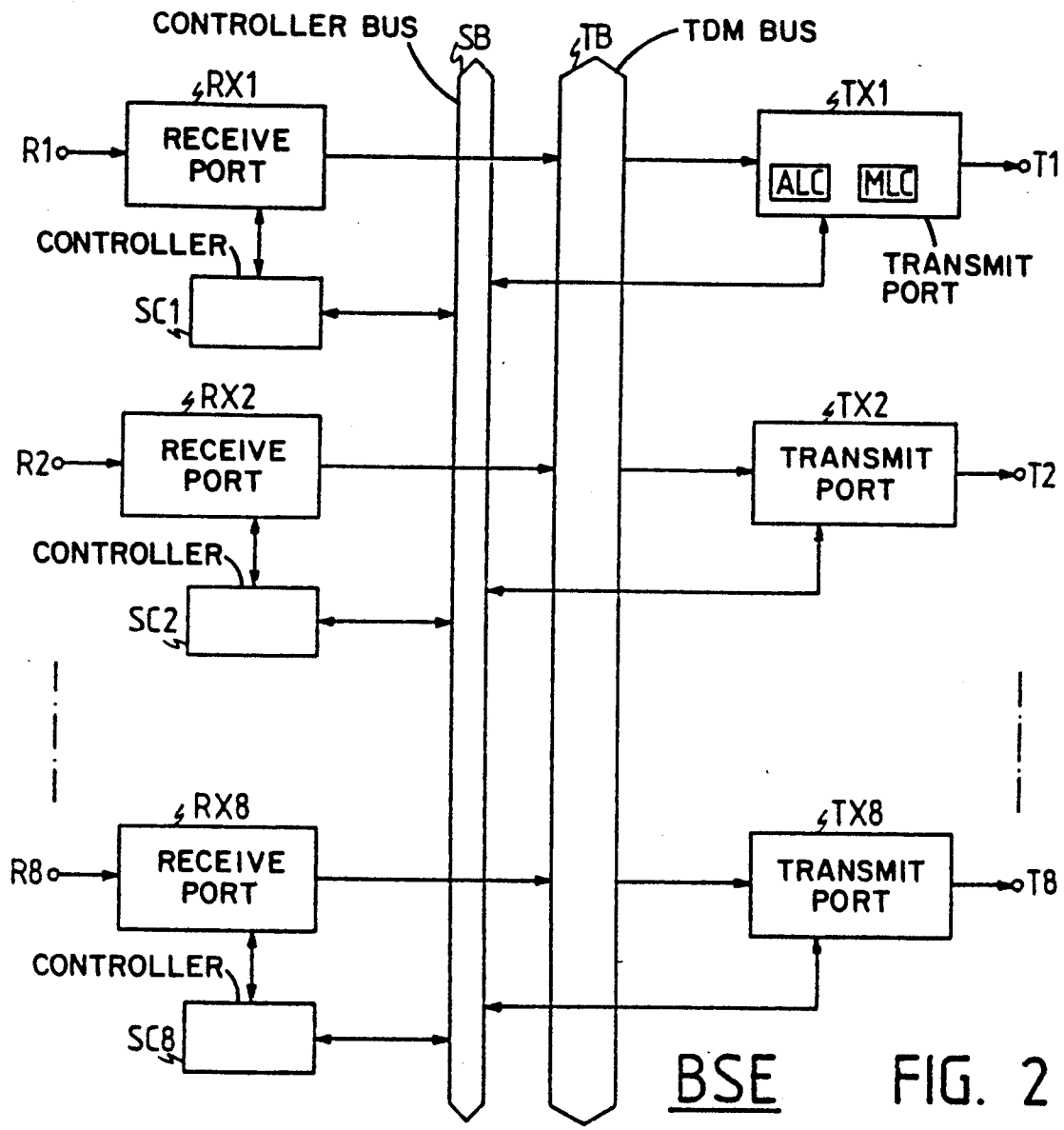
FIG. 2 shows a switching module BSE included in the BSN of FIG. 1.

The block diagram of a switching module BSE is shown in FIG. 2 and is similar, e.g., to the one disclosed in the Belgian patent BE 904100 (P. DEBUYSSCHER et al 3-5-1). BSE includes 8 (n) input terminals R1 to R8, 8 (n) output terminals T1 to T8, a Time Division Multiplex (TDM) bus TB and a switch port controllers bus SB. Each input terminal R1 to R8 is connected to a distinct receive port RX1 to RX8 respectively, and all these receive ports RX1 to RX8 are coupled to the bus TB which is further coupled to 8 transmit ports TX1 to TX8, each connected to a distinct output terminal T1 to T8 respectively. Each receive port RX1 to RX8 is also bidirectionally connected to a distinct switch port controller SC1 to SC8 respectively. All these controllers are coupled to the bus SB which is also coupled to all the transmit ports TX1 to TX8. The purpose of BSE is to transmit an incoming packet arriving at any of its 8 input terminals R1/R8 to any of its 8 output terminals T1/T8 in an asynchronous way via the TDM bus TB. Each receive port RX1/RX8 performs phase and packet synchronisation, and also clock signal extraction and packet's header correction if required. Each transmit port TX1/TX8 contains basically a buffer to store packets and is able to perform clock signal generation.

As mentioned above, each stage of the switching network BSN includes a number of switching modules BSE. These stages are interconnected by linking the outputs terminals T1/T8 of the switching modules of one stage to the input terminals R1/R8 of the switching modules of the following stage so as to form a self routing network well known in the art, e.g. from the article "ITT 1240 Digital Exchange - Digital Switching Network" by J. M. COTTON et al, published in "Electrical Communication - THE TECHNICAL JOURNAL OF ITT", Volume 56 - Number 2/3 - 1981, pages 148 to 160.

As will be described in more detail later, the packets flowing through BSN are of two types: data packets and control packets. Both these types of packets include a routing field containing addresses of the transmit ports TX1/TX8 of the switching modules BSE through which they have to pass.

A data packet contains data to be transmitted between a calling user station IU1/IUN and a destination user station OU1/OUN. Its routing field always contains all the addresses of the transmit ports TX1/TX8 through which this data packet has to be routed. When a data packet enters a receive port RX1/RX8 of a switching module BSE it is routed via the bus TB to the transmit port TX1/TX8 whose address corresponds to that indicated for this particular switching module BSE in the routing field of this data packet. In order to guarantee an in-sequence arrival of all the data packets belonging to a same communication, a same path through BSN is followed by all these data packets. Therefore, the routing fields of all the data packets of a same communication contain the same addresses of transmit ports TX1/TX8.

A control packet is used, e.g., to set up a path through the switching network BSN between a calling user station IU1/IUN and a destination user station OU1-/OUN. Therefore it contains call set up information such as the identities of the calling and destination user stations. To allow the distribution network DN to evenly distribute the traffic load over the BSN, the first addresses of transmit ports contained in the routing field of a call set up control packet, which is a particular type of control packet as will be explained later, are missing. For each of these missing addresses, the switch port controller SC1/SC8 connected to the concerned receive port RX1/RX8 randomly selects a transmit port TX1/TX8 and substitutes in the routing field of that call set up control packet the address of the selected transmit port for the missing address.

The part of the switching network BSN wherein the transmit ports TX1/TX8 of the switching modules BSE may be randomly selected by the switch port controllers SC1/SC8 constitutes the distributed network DN, whilst the part of the BSN wherein the transmit ports TX1/TX8 are indicated by addresses contained in the routing field of the packets flowing through these switching modules constitutes the routing network RN. More particularly, the distribution network DN behaves, only for the first packet of a communication, i.e. for the call set up control packet, as a randomization network to distribute the traffic load over the switching network BSN, whilst it behaves as a routing network, such as RN, for all the following data packets of that communication because the path established by the call set up control packet must be maintained during the whole communication.

The transmit ports TX1/TX8 each further include an average traffic load counter ALC and a maximum traffic load counter MLC (only shown for TX1 in FIG. 2). These counters contain the average and maximum values of the accumulated traffic loads constituted by all the communications flowing through that transmit port TX1/TX8. When a call set up control packet enters a receive port RX1/RX8 and when a transmit port TX1/TX8 is selected by the switch port controller SC1/SC8, randomly or with respect to the address contained in the routing field of that packet, this same switch port controller SC1/SC8 also performs a check to know whether the new forthcoming communication is acceptable by the selected transmit port TX1/TX8 or not. To this end, the average value ABR and the maximum value MBR of the traffic load or bit rates of the forthcoming communication are contained in the call set up control packet and, upon receipt of this packet, the switch port controller SC1/SC8 checks whether the selected transmit port TX1/TX8 is able to accept this call by taking into account the traffic load values already stored in the corresponding counters ALC and MLC of this transmit port. More particularly, the counters ALC and MLC are preset to zero and the values contained therein are incremented by the values ABR and MBR respectively each time a call set up control packet is accepted by the corresponding transmit port TX1/TX8. When a new call set up control packet arrives at a receive port RX1/RX8 of a switching module BSE of the distribution network DN, the corresponding switch port controller SC1/SC8 selects a transmit port TX1/TX8 and the values ABR and MBR carried by this control packet are added to the contents of the counters ALC and MLC respectively of this selected transmit port TX1/TX8. The results are then compared with maximum admissible values of traffic load for the selected transmit port TX1/TX8. Since, e.g., 560 Megabit/second is the maximum allowed traffic on the communication line, a value such as 560×0.8 constitutes the maximum allowed traffic through a transmit port TX1/TX8, 0.8 being a security factor. Due to this check, the probability of overflow of the buffer included in the selected transmit port TX1/TX8 and the risk that the communications already flowing through this transmit port TX1/TX8 become of unacceptable quality are then reduced assuming that the values of traffic load ABR and MBR given by the call set up control packet are respected during the whole forthcoming communication. In the distribution network DN, if these values are not acceptable for the selected transmit port TX1/TX8, another transmit port is selected by SC1/SC8.

Since the packets sent and received by the user stations IU1/IUN and OU1/OUN on the respective asynchronous time division (ATD) multiplex transmission links IL1/ILN and OL1/OLN must satisfy the required standards, e.g. CCITT norms, and that the packets flowing through the switching network BSN generally contain additional information, e.g. a routing field, interface circuits are necessary between the user stations IU1/IUN, OU1/OUN and the switching network BSN. These interface circuits are the broadband subscriber modules IB1 to IBN and OB1 to OBN shown in FIG. 1.

To simplify the broadband subscriber modules IB1/IBN, OB1/OBN, the data packets transmitted through the BSN and which have not to satisfy standards have a format which is as much as possible similar to that of the packets transmitted on the transmission links IL1/ILN or OL1/OLN.

A typical packet as used by a calling user station IU1/IUN is shown in FIG. 3(a). It has a fixed length of, e.g., 144 bits of which the 16 first bits are used has an header containing the number or Data Link Connection Identifier DLCI, say LII, and the remaining 128 bits contain communication data INF. Signalling information used by this call originating user station IU1/IUN is transmitted to the connected subscriber module IB1/IBN via the corresponding transmission link IL1/ILN during a predetermined signalling logical channel which has, e.g., the DLCI number 0, i.e. LII equals 0, whilst data packets are transmitted on the transmission link IL1/ILN during a DLCI number different from 0.

Packets flowing through the switching network BSN are shown in the FIGS. 3(b) and 3(c).

A data packet is shown in FIG. 3(b) and has a length of, e.g., 166 bits. The first of these bits identifies the type of packet I, e.g. 0 for a data packet, and is followed by the routing field RF which has a length of 21 bits. The routing field RF contains information which is sufficient to allow each switching module BSE through which this data packet passes to decide to which of its transmit ports TX1/TX8 the incoming data packet must be routed. Since the destination routing principle and a self routing switching network are used, the routing field RF at least contains the address of the destination switching module OB1/OBN. This address is also necessary for the control packets described below. The third field of this data packet has a length of 144 bits and contains information corresponding to that contained in the data packet transmitted on the transmission links IL1/ILN and OL1/OLN. More particularly, the DLCI number LII used by the calling user station IU1/IUN is replaced in the third field of this data packet by the DLCI number LIO which will be used by the destination user station OU1/OUN. By removing the type I and the routing field RF of the data packet shown in FIG. 3(b), the packet shown in FIG. 3(a) can be rebuilt in the destination subscriber module OB1/OBN prior to being sent to the destination user station OU1/OUN via its transmission link OL1/OLN.

A control packet is shown in FIG. 3(c) and, for reasons of efficiency of the operation of the network BSN, this packet has the same length as the above data packet shown in FIG. 3(b), i.e. 166 bits. Also by similarity with this data packet, the first bit of a control packet identifies the type of packet I, e.g. 1 for a control packet, and is followed by the routing field RF which has a length of 21 bits. The third field of this control packet contains control parameters to set up or cancel a communication. Therefore, different types of control packets exist and will be described in detail below. For reasons of uniformity, equal parameters have a same location in the different control packets and if they have no meaning the location is left empty. An identification T of the control packet is given by the first three bits of the third field. The following 16 bits give the DLCI number LII used by the originating transmission link IL1/ILN, and are followed by 16 bits giving the DLCI number LIO used by the destination transmission link OL1/OLN. Then comes the type of service field SERV which has a length of 32 bits and includes, e.g., the average ABR and maximum MBR traffic load values of the communication. The remaining bits of the third field are partly used, e.g. 21 bits, to identify the routing field PTH of the return path as will be explained below.

The four basic types of control packets are described hereinafter. For reasons of printing facilities, their format will be represented as follows:

[I,RF,T,LII,LIO,SERV,PTH]

where an empty field is replaced by an underscore character.

SETUP [1,RF,1,LII,_,SERV,PTH]

The SETUP control packet contains enough information to prepare a path through all the switching modules BSE of the broadband switching network BSN. A SETUP control packet is launched in the BSN by the originating subscriber module IB1/IBN in order to establish an unidirectional communication path between the originating user station IU1/IUN and the destination user station OU1/OUN. If a bidirectional communication path has to be set up between these two user stations IU1/IUN and OU1/OUN, the destination subscriber module OB1/OBN must launch a second SETUP control packet in the BSN in the direction of the originating subscriber module IB1/IBN. This second SETUP control packet has parameters similar to those used in the first SETUP control packet. However, the originating parties become the destination parties and vice versa. This is also true for the other control packets described below. The parameters of a SETUP control packet are as follows:

the first bit I is set to 1 indicating that it is a control packet;

the routing field RF contains the addresses of the transmit ports TX1/TX8 of the switching modules BSE through which this control packet and the forthcoming data packets belonging to the same communication must be routed. As mentioned above, the first addresses of this routing field RF are missing in order to allow the distribution of the traffic load over the BSN by the distribution network DN. These missing addresses are gradually replaced by the addresses of the transmit ports TX1/TX8 through which the control packet is routed by and in DN;

the identification field T, e.g., 1, indicates that it is a SETUP control packet;

the incoming DLCI field LII contains the DLCI number used to transfer data packets on the transmission link IL1/ILN between the originating user station IU1/IUN and the connected subscriber module IB1-/IBN. This value is not used by the switching network BSN but only by the destination subscriber module OB1/OBN to create return packets;

the outgoing DLCI field LIO is empty because the DLCI number which will be used to transfer data packets on the transmission link OL1/OLN between the destination user station OU1/OUN and the connected subscriber module OB1/OBN is not yet known;

the type of service field SERV contains the average bit rate ABR and the maximum bit rate MBR requested for the communication and necessary to check if the transmit ports TX1/TX8 through which this control packet is routed can accept the traffic load of the forthcoming communication; and the return path PTH is empty when the SETUP control packet leave the subscriber module IB1/IBN of the originating user station IU1/IUN, but will be gradually filled when this control packet progresses through the switching modules BSE in the switching network BSN. When this control packet arrives at destination, its PTH field contains the addresses of the receive ports RX1/RX8 of the switching modules BSE through which this control packet was routed. This parameter PTH is necessary when the SETUP control packet is blocked somewhere in the switching network BSN. In that case, all the switching modules BSE already prepared for that communication must be informed that the path already set up has to be released. More in detail, the values contained in the counters ALC and MLC of their transmit ports TX1/TX8 must be decreased by the respective values ABR and MBR contained in the SERV field of the SETUP control packet. To this end, a path blocked (BLOCKED) control packet described later and created by the blocking switching module BSE must know the reverse path through the BSN up to the originating subscriber module IB1/IBN.

CONFIRM [1,RF,2,LII,LIO,_,PTH]

This control packet confirms the arrival of the SETUP control packet in the subscriber module OB1-/OBN connected to the destination user station OU1-/OUN via the destination transmission link OL1/OLN. This CONFIRM control packet is not used by the switching modules BSE but only by the originating subscriber module IB1/IBN of the SETUP control packet. The parameters of a CONFIRM control packet are as follows:

the bit I is set to 1 indicating that it is a control packet;

the routing field RF is a copy of the return path (PTH) whose addresses were gathered by the previous SETUP control packet. In principle, the path through the BSN followed by the CONFIRM control packet and indicated by its routing field RF must not be the same as the path followed by the SETUP control packet. However a minimum of information concerning the address of the originating subscriber module IB1-/IBN to which this control packet must be routed, i.e. at least the last addresses of the path between OB1/OBN and IB1/IBN, is extracted from the return path field (PTH) of the SETUP control packet;

the identification field T is set to 2 indicating a CONFIRM control packet;

the field LII contains the DLCI number used by the calling user station IU1/IUN;

the field LIO contains the DLCI number used by the destination user station OU1/OUN;

the type of service field SERV is empty because the transmit ports TX1/TX8 of the switching modules BSE used by this communication have already been prepared by the SETUP control packet; and the return path field PTH now contains the completed routing field (RF) of the previous SETUP control packet so that this information can be used to fill the routing field (RF) of the following data packets belonging to this communication.

CLEAR [1, RF,3,LII,LIO,SERV,_]

This communication cleaning control packet can be sent either by the calling user station IU1/IUN or by the destination user station OU1/OUN and informs the subscriber module OB1/OBN, IB1/IBN connected to the other parties about the clearing or completion of the communication. During its transmission through the switching network BSN, this CLEAR control packet informs all the traffic load counters ALC and MLC of the transmit ports TX1/TX8 through which this control packet progresses that their contents may be decreased by the respective values of the average ABR and of the maximum MBR traffic load contained in its SERV field. Therefore, this CLEAR control packet has to follow the same path, or the same paths in the case of a bidirectional communication, than the SETUP control packet or packets and all the data packets belonging to this communication.

The parameters of the CLEAR control packet are as follows:

the bit I is set to 1;

the routing field RF contains the completed routing field RF of the earlier SETUP control packet sent by the releasing subscriber module, e.g. IB1/IBN if the communication is released by the calling user station IU1/IUN;

the identification field T is set to 3 for a CLEAR control packet;

the field LII contains the DLCI number used by the calling user station IU1/IUN on its transmission link IL1/ILN;

the field LIO contains the DLCI number used by the destination user station OU1/OUN on its transmission link OL1/OLN to allow the connected subscriber module OB1/OBN to inform this user station OU1/OUN that the communication is released by the originating user station IU1/IUN;

the type of service field SERV contains ABR and MBR to decrease the respective counters ALC and MLC of the transmit ports TX1/TX8 used by this communication; and the return path field PTH is empty.

BLOCKED [1,RF,4,LII,_,SERV,¬]

The BLOCKED control packet is used to clear an only partly prepared path through the BSN when a switching module BSE blocks this path because, e.g., the selected transmit port TX1/TX8 cannot accept the additional average bit rate ABR value or/and maximum bit rate MBR value contained in the type of service field SERV of the SETUP control packet and requested for this communication. A BLOCKED control packet is then constructed by the blocking switching module BSE which uses all the information contained in the incoming SETUP control packet. The parameters of a BLOCKED control packet are as follows:

the bit I is set to 1;

the routing field RF contains the partly filled return path field (PTH) of the SETUP control packet as it was at the moment this control packet was blocked;

the identification field T is set to 4 for a BLOCKED control packet;

the field LII contains the DLCI number used by the calling user station IU1/IUN on its transmission link IL1/ILN;

the field LIO is empty because the corresponding DLCI number is not yet known;

the type of service field is copied from the SERV field of the incoming SETUP control packet and is used by the switching modules BSE through which this BLOCKED control packet passes to decrease the contents of the counters ALC and MLC counters in the corresponding transmit ports TX1/TX8 as for the CLEAR control packet; and the return path field PTH is empty or may contain a copy of the routing field (RF) of the SETUP control packet.

In a preferred embodiment both networks DN and RN are folded and combined into one bidirectional network BSN with the N input terminals I1/IN and the N output terminals O1/ON grouped into N input/output terminals on one side of this switching network BSN and a mirror plane at the other side. Then, the part of BSN between the calling user stations IU1/IUN and the mirror plane constitutes the distribution network DN, whilst the part of BSN between the mirror plane and the destination user stations OU1/OUN constitutes the routing network RN. The principle of a folded switching network is already known in the art, e.g. from the above mentioned article "ITT 1240 Digital Exchange—Digital Switching Network" by J. M. COTTON et al, and is here applied to broadband switching techniques. By virtually displacing the mirror plane with respect to the N input/output terminals the number of switching stages through which a communication has to pass may be modified. This has the advantage that, e.g. for short distance calls, the mirror plane may be closer to the input/output terminals so that the number of switching modules BSE used as well as the traffic load over the network BSN are reduced.

The above description of the operation of a broadband switching network BSN will now be illustrated by an example which refers to FIG. 4.

In this example, a user having the directory number 134, i.e. corresponding to the originating user station IU134, wants to set up a bidirectional videophone communication with the user having the directory number 823, i.e. coresponding to the destination user station OU823. As mentioned above the originating user station IU134 is connected to the broadband subscriber module IB134 via the transmission link IL134, whilst the destination user station OU823 is connected to the subscriber module OB823 via the transmission link OL823. IU134 and OL823 are not shown in FIG. 4.

The broadband switching network BSN has five stages of broadband switching modules BSE. This means that the above communication will be routed through five distinct switching modules BSE. Each switching stage includes four groups of switching modules BSE. These groups are numbered G11 to G14, G21 to G24, G31 to G34, G41 to G44 and G51 to G54 for the first, second, third, fourth and fifth stages respectively. Only the groups used by the above communication are shown in FIG. 4. Each of these groups includes four switching modules BSE. More particularly, the switching modules E111 to E114, E211 to E214, E311 to E314, E341 to E344, E441 to E444 and E541 to E544 form part of the groups G11, G21, G31, G34, G44 and G54 respectively. The reference numerals 1 to 8 in the switching modules E111 to E544 shown in FIG. 4 indicate equally a receive port RX1/RX8 or a transmit port TX1/TX8 of the concerned modules.

The distribution network DN is constituted by the first and second switching stages, i.e. by the groups G11 to G14 and G21 to G24, whilst the routing network RN is constituted by the third, fourth and fifth switching stages, i.e. by the groups G31 to G34, G41 to G44 and G51 to G54, the third stage being the mirror plane of the switching network BSN.

To set up a videophone communication with the destination user station OU823, the calling user station IU134 sends a call set up request to its subscriber module IB134 via its transmission link IL134 in the signalling DLCI, i.e. the DLCI number 0. This call set up request includes:

the directory number 823 of the destination user station OU823;

the number of the DLCI on which the data will be transmitted on the originating transmission link IL134, e.g. LII=07; and the type of service SERV of this call, i.e. the average bit rate, e.g. ABR=1500 kilobit/second (kbps), and the peak or maximum bit rate, e.g. MBR=5000 kbps.

The broadband subscriber module IB134 generates then a SETUP control packet having the format:

[1,XX823,1,07,—,1500-5000, XXXXX]

and launches this control packet through the BSN via the terminal I134. Since the BSN is constituted by five switching stages, this control packet is routed through five switching modules BSE and therefore, five positions are reserved for addresses of transmit ports TX1/TX8 in the routing field RF and in the return path field PTH. However, the destination address being sufficiently defined by three addresses 8, 2 and 3, the two first addresses of RF remain empty or have no signification, as indicated above by X, so has to be filled in by the addresses of the transmit ports TX1/TX8 selected by the switching modules of the distribution network DN.

Because of the self routing architecture of the switching network BSN, the SETUP control packet first arrives at the receive port, e.g. 4, of the switching module E113 of the group G11 in the first stage. Since the first address in the routing field RF of this SETUP control packet, which corresponds to the first transmit port to be used, is empty, E113 randomly selects a transmit port, e.g. 8, and checks wether the incoming call is acceptable or not for that transmit port. Therefore, the values ABR and MBR of the traffic load contained in SERV are added to the average and maximum values of traffic load contained in the respective ALC and MLC counters of the transmit port 8 and the results are compared with maximum acceptable values of traffic load for this transmit port. If the traffic load required by the forthcoming communication is accepted, the return path field PTH is set to 4XXXX indicating that the receive port 4 was used, whilst the contents of the routing field RF is rotated and the address of the selected transmit port 8 is inserted therein. This routing field RF then becomes X8238. The updated SETUP control packet is then sent from the transmit port 8 of E113 to the receive port 3 of E214.

When this SETUP control packet arrives at the receive port 3 of E214 the same scenario as above is repeated. Since the first address in the routing field RF is still empty (X) a transmit port, e.g. 7, is selected by E214 and the corresponding traffic load counters ALC and MLC are checked. Assuming that the result of this check is negative, another transmit port, e.g. 5, is selected by E214. If the latter port 5 is able to support the load, the SETUP control packet is launched to the third switching stage after having filled and rotated the return path field PTH which is now 34XXX and the routing field RF which is now 82385.

At the arrival on the receive port 1 of the switching module E314 of the third stage, the first address in the routing field indicates that the transmit port 8 must be selected. The traffic load counters of this transmit port 8 are thus checked to know whether the required load can be accepted and, in the assumption of an affirmative answer, the SETUP control packet is launched further to the receive port 5 of E444 in the fourth switching stage. The routing field RF is then 23858 and the return path field PTH is 134XX.

As for E314, the transmit port 2 of E444 must be selected. If this transmit port 2 accepts the loads ABR and MBR, the SETUP control packet is sent further to the receive port 8 of E542 in the fifth stage. Then, RF is equal to 38582 and PTH is equal to 5134X.

In E542, the transmit port 3 must be selected and from that port on, assuming that the loads are accepted, the SETUP control packet is sent to the destination broadband subscriber module OB823 via the terminal O823. The routing field RF and the return path field PTH are then 85823 and 85134 respectively.

The destination broadband subscriber module OB823 then selects a free DLCI, e.g. LIO=26, on the destination transmission link OL823 connected to the destination user station OU823. Further, OB823 internally creates a logical association of information having the format:

[(823,26),(134,07),X,pending]

of which the parameters respectively indicate

[(source-address,source-DLCI-number),
(destination-address,destination-DLCI-number),
data-path,status]

wherein the words "source" and "destination" are indicated with respect to this subscriber module OB823.

OB823 then sends to the BSN a CONFIRM control packet with the following information:

[1,XX134,2,07,26,_,85823]

This CONFIRM control packet will find its way through the BSN and will most probably follow a different route as the one used by the previous SETUP control packet. Such a CONFIRM control packet can always progress through the BSN to its destination address indicated by the routing field RF because no request for load is given, i.e. that the type of service field SERV is empty. When this CONFIRM control packet arrives at the originating subscriber module IB134 via the input terminal I134, it confirms an unidirectional connection established between the originating user stations IU134 and the destination user station OU823. Since this CONFIRM control packet also contains the selected path 85823 (PTH) followed by the SETUP control packet, the originating subscriber module IB134 is able to set up the logical association of information:

[(134,07),(823,26),85823,pending]

as defined above.

The destination subscriber module OB823 also sends to the destination user station OU823 via the signalling DLCI of OL823 a packet which informs this user about a videophone communication request on DLCI number 26, with the type of service parameters ABR=1500 kbps and MBR=5000 kbps.

If the user 823 wants to set up a bidirectional communication, the subscriber module OB823 must construct a SETUP control packet which will be launched through the BSN in the direction of IB134. For creating this path through the BSN in the opposite direction of the previous one, the same procedure as described above with a SETUP and a CONFIRM control packets is followed. One assumes that the path followed by this SETUP control packet was fully accepted and that routing field RF and the return path field PTH are equal to 58134 and 58823 respectively.

When this SETUP control packet arrives at the originating subscriber module IB134, the status of the logical association mentioned above is set to "active". A CONFIRM control packet is then returned to the destination subscriber module OB823 and a call connected packet is sent to the originating user station IU134 on the signalling DLCI of IL134. When this CONFIRM control packet is received at OB823 the logical association of information created therein becomes:

[(823,26),(134,07),58134,active]

which indicates that the addresses of the routing field RF of the one directional return path are 5, 8, 1, 3 and 4.

If a SETUP control packet is blocked in the switching network BSN, a BLOCKED control packet is returned to the subscriber module which had sent this SETUP control packet. This can for instance be the case of the SETUP control packet sent by IB134 which is blocked at E314 because the transmit port 8 thereof cannot accept the extra loads ABR or/and MBR without introducing a high risk for the already set up communications flowing through it to become of unacceptable quality. The BLOCKED control packet then generated by E314 has the format:

[1,34XXX,4,07,_,1500-5000,_]

which allows this BLOCKED control packet to return to the originating subscriber module IB134 by using the same path through the BSN as that which was followed by the SETUP control packet but in the opposite direction. When this BLOCKED control packet arrives at the receive port 5 of E214, the contents of the counters ALC and MLC of the corresponding transmit port 5 are decreased by 1500 and 5000 respectively. The routing field RF of this BLOCKED control packet is then rotated to 4XXX3 and this packet is transmitted to the transmit port 3 of E214 from where it will be routed to the receive port 8 of E113. Here again the contents of the counters ALC and MLC of the corresponding transmit port 8 are decreased by 1500 and 5000 respectively. The routing field RF is rotated to XXX34 and the BLOCKED control packet is sent to IB134 via the transmit port 4 of E113 and the terminal I134 of the BSN. When this BLOCKED control packet arrives at the subscriber module IB134, the latter may decide to try again to sent a new SETUP control packet because another path through the distribution network DN will then probably be selected, or to clear the requested videophone communication in which case it has to inform the originating user station IU134 that this call is cancelled.

If the paths through BSN can be established in the two directions as mentioned above, data packets of videophone information can be sent between the user stations IU134 and OU823.

User data packets sent by the user station IU134 and arriving in the subscriber module IB134 with LII=07 have the format [07,INF]. In IB134, they are converted into data packets to be transmitted to the destination subscriber module OB823 through the BSN. These data packets have the format:

[0,85823,26,INF].

In the destination subscriber module OB823 they are reconverted in their original format of user data packets, i.e. [07,INF].

In a similar way, user data packets sent by the destination user station OU823 and arriving in OB823 with LIO=26 are of the format [26,INF]. In OB823, they are converted into data packets to be transmitted to the subscriber module IB134 through the BSN. These data packets are of the format:

[0,58134,07,INF].

In the subscriber module IB134 they are reconverted into their original format of user data packets, i.e. [26,INF].

All these conversions are possible owing to the above mentioned logical associations of information stored in the broadband subscriber modules IB134 and OB823.

When, e.g., the user 134 wants to release the videophone communication, it sends a call release packet on the signalling DLCI of its transmission link IL134 to the subscriber module IB134. IB134 then creates a CLEAR control packet and launches it through the BSN to the destination user station OU823. This CLEAR control packet has the format:

[1,85823,3,07,26,1500-5000,—].

While this CLEAR control packet progresses through the BSN, all the values contained in the counters ALC and MLC of the concerned transmit ports ⅛ are decreased by the values 1500 and 5000 respectively. It is to be noted that the routing field RF indicates the complete path and that thus no randomization is allowed in the distribution network DN. When this CLEAR control packet arrives at the destination subscriber module OB823, the user station OU823 is informed of the release of the communication by a packet sent to it via the signalling DLCI on its transmission link OL823. The logical association of information created by and in OB823 is cancelled and a return CLEAR control packet is created by the destination subscriber module OB823. This CLEAR control packet has the format:

[1,58134,3,26,07,1500-5000,—].

As for the preceding CLEAR control packet, this control packet decreases the contents of the counters ALC and MLC of the concerned transmit ports ⅛ and at its arrival at the subscriber module IB134 the logical association of information which was created therein is cancelled.

While the principles of the invention have been described above in connection with specific apparatus, it is to be clearly understood that this description is made only by way of example and not as a limitation on the scope of the invention.

We claim:

1. Packet switching network (BSN) to transmit packets of information through a plurality of interconnected first and second switching modules (BSE) included therein, each of said switching modules having a plurality of receive ports (RX1/RX8) to receive said packets, a plurality of transmit ports (TX1/TX8) to transmit said packets, and selection means to select one of its transmit ports and to transfer packets arriving at one of its receive ports to said selected transmit port, said network including at least one of said first switching modules of which said selection means are at least able to select one of the transmit ports thereof without using routing information (RF) included in said packets, and at least one of said second switching modules of which said selection means are controlled by routing information included in said packets to select one of the transmit ports thereof, characterized in that, only for the first packet (SETUP) of a communication, the selection means of said first switching module select one of the transmit ports (TX1/TX8) thereof without using routing information (RF) contained in said packet, whereas for the following packets belonging to the same communication, the selection means of said first switching module select one of the transmit ports thereof under the control of routing information included in said following packets and relating to the route followed by said first packet.

2. Packet switching network according to claim 1, characterized in that said network comprises a first (DN) and a second (RN) part which are connected in cascade and include said first and second switching modules respectively.

3. Packet switching network according to claim 1, characterized in that said selection of said transmit port (TX1/TX8) without using said routing information (RF) occurs at random.

4. Packet switching network according to claim 1, characterized in that when said first packet (SETUP) reaches its destination (OB1/OBN), a path confirmation packet (CONFIRM) containing the addresses of the transmit ports (TX1/TX8) used by said first packet is returned through said network (BSN) to the communication originator (IB1/IBN) in order to provide to the latter the routing information (RF) for said following packets.

5. Packet switching network according to claim 2, characterized in that the switching modules (BSE) used in said first (DN) and in said second (RN) parts of said network (BSN) are identical.

6. Data processing system including multiplexing means wherein input data streams are multiplexed so as to form a multiplexed output data stream applied to at least one output of the system, characterized in that said multiplexing means of said data processing system include processing means which allow a said input data stream to form part of said output data stream or not, depending on the result of a comparison of a total traffic load with a predetermined limit traffic load, said total traffic load being obtained from traffic load parameters (ABR, MBR) of each of said input data streams forming part of said output data stream.

7. Data processing system according to claim 6, characterized in that the traffic load parameter of each input data stream is indicative of an average traffic load and said total traffic load is equal to the sum of said average traffic loads.

8. Data processing system according to claim 6, characterized in that the traffic load parameter of each input data stream is indicative of a peak traffic load and said total traffic load is equal to the sum of said peak traffic loads.

9. Data processing system according to claim 6, characterized in that it is a packet switching network (BSN) being able to transmit packets of information, containing routing information (RF), through switching modules (BSE) included therein, said switching modules being interconnected and each having a plurality of receive ports (RX1/RX8) to receive said packets, a plurality of transmit ports (TX1/TX8) to transmit said packets, and means to select one of its transmit ports and to transfer packets arriving at one of their receive ports to said selected transmit port, said switching modules (BSE) being able to try to further transmit a path set up packet (SETUP) with the purpose of setting up a path through said network (BSN), said path set up packet containing first information (ABR, MBR) comprising said traffic load parameters which are indicative of the traffic load constituted by communication packets to be transmitted along said path subsequently to the transmission of said path set up packet and in that each of said switching modules includes storage means (ALC, MLC) for storing second information indicative of said total traffic load constituted by communication packets belonging to communications handled by the switching module and is able to decide to further transmit said path set up packet depending on the result of said comparison.

10. Data processing system according to claim 9, characterized in that said switching modules (BSE) at the completion of the transmission of said communication packets along said path are able to transmit along said path a path clear packet (CLEAR) containing said first information (ABR, MBR) and in that each of said switching modules is able to modify said second information stored in its storage means (ALC, MLC) in accordance with said first information contained in a received path clear packet.

11. Data processing system according to claim 9, characterized in that if one of said switching modules (BSE) decides not to transmit said path set up packet (SETUP) to a following switching module, it transmits, along the portion of the path already set up by said path set up packet, a blocking packet (BLOCKED) containing said first information (ABR, MBR) and indicating to the preceding switching modules that the path is blocked, each of said preceding switching modules being then able to modify said second information stored in its storage means (ALC, MLC) in accordance with said first information contained in said blocking packet.

12. Data processing system according to claim 9, characterized in that said path set up packet (SETUP) contains routing information (RF) which is gradually completed by said switching modules (BSE) when they decide to transmit said path set up packet.

13. Data processing system according to claim 9, characterized in that at least one of said switching modules (BSE) of said packet switching network includes selection means which are at least able to select one of the transmit ports (TX1/TX8) thereof without using said routing information (RF) included in said path set up packet and, in case said switching module decides not to further transmit said path set up packet through said selected transmit port, are able to randomly select another of said transmit ports.

14. A data processing system according to claim 9, characterized in that said packet switching network transmits packets of information through a plurality of interconnected first and second switching modules (BSE) included therein, each of said switching modules having a plurality of receive ports (RX1/RX8) to receive said packets, a plurality of transmit ports (TX1/TX8) to transmit said packets, and selection means to select one of its transmit ports and to transfer packets arriving at one of its receive ports to said selected transmit port, said network including at least one of said first switching modules of which said selection means are able to select at least one of the transmit ports thereof without using routing information (RF) included in said packets, and at least one of said second switching modules of which said selection means are controlled by routing information included in said packets to select one of the transmit ports thereof, characterized in that, only for the first packet (SETUP) of a communication, the selection means of said first switching module select one of the transmit ports (TX1/TX8) thereof without using routing information (RF) contained in said packet, whereas for the following packets belonging to the same communication, the selection means of said first switching module select one of the transmit ports thereof under the control of routing information included in said following packets and relating to the route followed by said first packet, wherein said first packet is said path set-up packet (SETUP).

15. Packet switching network according to claim 14, characterized in that said network comprises a first (DN) and second (RN) part which are connected in cascade and include said first and second switching modules respectively.

16. Packet switching network according to claim 14, characterized in that said selection of said transmit port (TX1/TX8) without using said routing information (RF) occurs at random.

17. Packet switching network according to claim 14, characterized in that when said first packet (SETUP) reaches its destination (OB1/OBN), a path confirmation packet (CONFIRM) containing the addresses of the transmit ports (TX1/TX8) used by said first packet is returned through said network (BSN) to the communication originator (IB1/IBN) in order to provide to the latter the routing information (RF) for said following packets.

18. Packet switching network according to claim 15, characterized in that the switching modules (BSE) used in said first (DN) and in said second (RN) parts of said network (BSN) are identical.

* * * * *